US010565686B2

United States Patent
Lehtinen et al.

(10) Patent No.: US 10,565,686 B2
(45) Date of Patent: Feb. 18, 2020

(54) SYSTEMS AND METHODS FOR TRAINING NEURAL NETWORKS FOR REGRESSION WITHOUT GROUND TRUTH TRAINING SAMPLES

(71) Applicant: NVIDIA Corporation, Santa Clara, CA (US)

(72) Inventors: Jaakko T. Lehtinen, Helsinki (FI); Timo Oskari Aila, Tuusula (FI); Jon Niklas Theodor Hasselgren, Bunkeflostrand (SE); Carl Jacob Munkberg, Malmö (SE)

(73) Assignee: NVIDIA Corporation, Santa Clara, CA (US)

( * ) Notice: Subject to any disclaimer, the term of this patent is extended or adjusted under 35 U.S.C. 154(b) by 191 days.

(21) Appl. No.: 15/807,401

(22) Filed: Nov. 8, 2017

(65) Prior Publication Data

US 2018/0357753 A1 Dec. 13, 2018

Related U.S. Application Data

(60) Provisional application No. 62/518,447, filed on Jun. 12, 2017.

(51) Int. Cl.
*G06T 5/00* (2006.01)
*G06N 3/08* (2006.01)
*G06N 3/04* (2006.01)

(52) U.S. Cl.
CPC .......... *G06T 5/002* (2013.01); *G06N 3/0454* (2013.01); *G06N 3/08* (2013.01); *G06N 3/084* (2013.01);

(Continued)

(58) Field of Classification Search
CPC ................ G06T 5/002; G06T 2200/28; G06T 2207/20081; G06T 2207/20084; G06N 3/08; G06N 3/084; G06N 3/0454
See application file for complete search history.

(56) References Cited

U.S. PATENT DOCUMENTS 5,390,285 A 2/1995 Wood
5,444,796 A * 8/1995 Ornstein ............. G06K 9/6267
382/157

(Continued)

OTHER PUBLICATIONS

Bourely et al., "Sparse Neural Networks Topologies," Cornell University Library, Jun. 2017, pp. 1-12 retrieved from https://arxiv.org/abs/1706.05683.

(Continued)

*Primary Examiner* — Yon J Couso
(74) *Attorney, Agent, or Firm* — Leydig, Voit & Mayer, Ltd.

(57) ABSTRACT

A method, computer readable medium, and system are disclosed for training a neural network. The method includes the steps of selecting an input sample from a set of training data that includes input samples and noisy target samples, where the input samples and the noisy target samples each correspond to a latent, clean target sample. The input sample is processed by a neural network model to produce an output and a noisy target sample is selected from the set of training data, where the noisy target samples have a distribution relative to the latent, clean target sample. The method also includes adjusting parameter values of the neural network model to reduce differences between the output and the noisy target sample.

20 Claims, 13 Drawing Sheets

(52) U.S. Cl.
CPC ............ *G06T 2200/28* (2013.01); *G06T 2207/20081* (2013.01); *G06T 2207/20084* (2013.01)

(56) References Cited

U.S. PATENT DOCUMENTS

| | | | |
|---|---|---|---|
| 6,067,535 | A | 5/2000 | Hobson et al. |
| 6,108,648 | A | 8/2000 | Lakshmi et al. |
| 6,128,609 | A | 10/2000 | Rose |
| 7,401,056 | B2 | 7/2008 | Kam |
| 7,653,605 | B1 * | 1/2010 | Jackson ............ G06N 20/00 706/20 |
| 8,700,552 | B2 | 4/2014 | Yu et al. |
| 8,788,444 | B2 | 7/2014 | Ball et al. |
| 9,633,306 | B2 | 4/2017 | Liu et al. |
| 2012/0213429 | A1 | 8/2012 | Vasudevan et al. |
| 2014/0072242 | A1 | 3/2014 | Wei et al. |
| 2014/0156575 | A1 | 6/2014 | Sainath et al. |
| 2016/0019459 | A1 * | 1/2016 | Audhkhasi ......... G06K 9/6217 706/22 |
| 2017/0024642 | A1 | 1/2017 | Xiong et al. |
| 2017/0154279 | A1 | 6/2017 | Aharonov et al. |
| 2017/0293659 | A1 | 10/2017 | Huang |

OTHER PUBLICATIONS

Krishan, "Autoencoders: Sparse and Deep," From Data to Decisions, Jul. 7, 2016, pp. 1-5 retrieved from https://iksinc.online/2016/07/07/autoencoders/.

Wei et al., "Minimal Effort Back Propagation for Convolutional Neural Networks," ArXiv, 2017, pp. 1-8 retrieved from https://arxiv.org/pdf/1709.05804.pdf.

Srinivas et al., "Training Sparse Neural Networks," IEEE Conference on Computer Vision and Pattern Recognition Workshops, Aug. 24, 2017, pp. 138-145.

Munkberg et al., U.S. Appl. No. 15/881,632, filed Jan. 26, 2018.

* cited by examiner

*photo by Samuli Vuorinen*

SYSTEMS AND METHODS FOR TRAINING NEURAL NETWORKS FOR REGRESSION WITHOUT GROUND TRUTH TRAINING SAMPLES

CLAIM OF PRIORITY

This application claims the benefit of U.S. Provisional Application No. 62/518,447 titled "TRAINING NEURAL NETWORKS FOR REGRESSION WITHOUT GROUND TRUTH TRAINING SAMPLES," filed Jun. 12, 2017, the entire contents of which is incorporated herein by reference.

FIELD OF THE INVENTION

The present invention relates to training neural networks, and more particularly to training neural networks for regression without ground truth training samples.

BACKGROUND

Many regression tasks involve the restoration of data corrupted by some form of degradation. Examples include the denoising of photographs, renderings, or audio signals. Neural networks, and in particular "denoising autoencoders with skip connections" or U-Nets, have been demonstrated to yield superior performance for many such tasks. The neural network is trained to output a restored version of data when provided a corrupted version of the data as an input. Training is accomplished by running corrupted input data through the current network, comparing the output of the neural network (i.e., prediction) to the ground truth training target data that is a clean version of the data, and adjusting the neural network parameters by stochastic gradient descent with the aid of backpropagation.

Traditionally, training a neural network requires a large corpus of training data including different pairs (X', Y) of noisy input samples X' and clean target samples Y (i.e., ground truth training samples). In some scenarios, however, obtaining clean training samples is difficult or slow, while obtaining noisy examples is easy. An obvious example is a Monte Carlo rendering: a quick render with only a few samples per pixel is fast to compute, but a converged, noiseless image may take hours to produce. There is a need for addressing these issues and/or other issues associated with the prior art.

SUMMARY

A method, computer readable medium, and system are disclosed for training neural networks. The method includes the steps of selecting an input sample from a set of training data that includes input samples and noisy target samples, where the input samples and the noisy target samples each correspond to a latent, clean target sample. The input sample is processed by a neural network model to produce an output, and a noisy target sample is selected from the set of training data, where the noisy target samples have a distribution relative to the latent, clean target sample. The method also includes adjusting parameter values of the neural network model to reduce differences between the output and the noisy target sample.

DETAILED DESCRIPTION

Rather than training a neural network using noisy input samples and a clean target sample, a technique is described for training a neural network using noisy input samples and noisy target samples. The neural network can be trained to output the clean target sample—without ever using a clean target sample Y during the training process. Instead, a noisy target sample Y' is used to train the neural network.

Using noisy target samples instead of clean target samples can drastically reduce the time and computations needed to produce a training dataset. Therefore, the time needed to complete the entire training process is reduced. Importantly, training can also be performed in real-time. For example, training can be performed as noisy input images X' are received from an image capture device or rendered.

Figure 1A:
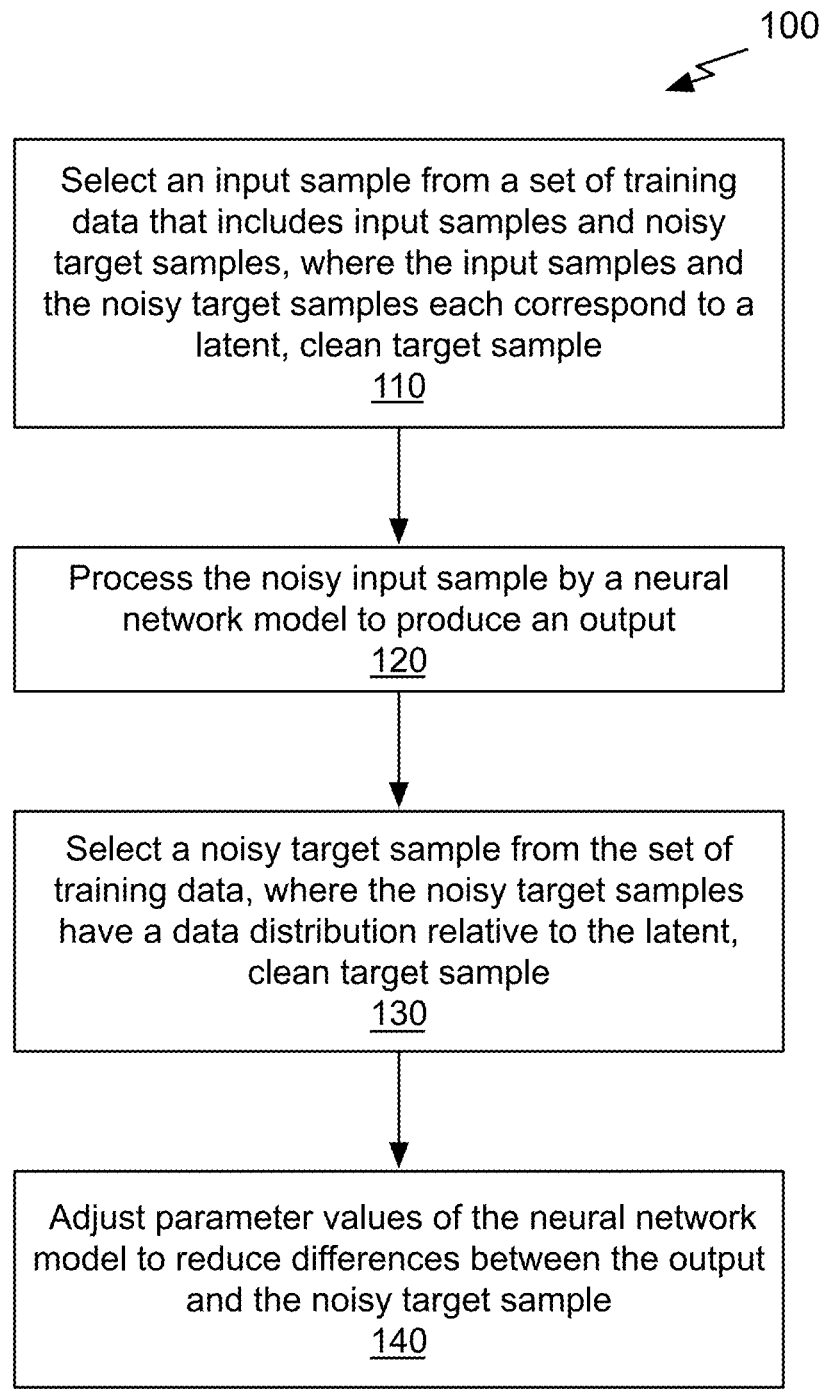
FIG. 1A illustrates a flowchart of a method for training a neural network, in accordance with one embodiment.

FIG. 1A illustrates a flowchart of a method 100 for training a neural network, in accordance with one embodiment. The method 100 is described in the context of a neural network, and the method 100 may also be performed by a program, custom circuitry, or by a combination of custom circuitry and a program. For example, the method 100 may be executed by a graphics processing unit (GPU), central processing unit (CPU), or any processor capable of performing the necessary processing operations. Furthermore, persons of ordinary skill in the art will understand that any system that performs method 100 is within the scope and spirit of embodiments of the present invention.

At step 110, an input sample X' is selected from a set of training data that includes input samples X' and noisy target samples Y', where the input samples and the noisy target samples each correspond to a latent, clean target sample Y. While Y is present within the Y' target samples, Y cannot be directly observed and is therefore "latent". In one embodiment, the set of training data is image data. In another embodiment, the set of training data is audio data. In the context of the following description, the set of training data may include samples of signals representing any type of data. In other words, the training technique that uses noisy target samples is domain independent.

The input samples may be clean (X) or noisy (X'). However, as previously explained, obtaining clean input samples is difficult. Importantly, if the input samples in the training dataset are noisy (X'=X+N1), the noise N1 in the input samples should not be correlated with noise N2 in the noisy target samples (Y'=Y+N2). In other words, the noise N1 is not correlated with the noise N2 for a training pair (X',Y').

At step 120, the input sample is processed by a neural network model to produce an output. The neural network is deemed to be sufficiently trained when the outputs generated for the input samples match the latent, clean target sample or a threshold accuracy is achieved for the training dataset.

At step 130, a noisy target sample is selected from the set of training data, where the noisy target samples have a distribution relative to the latent, clean target sample. In one embodiment, the distribution of the noisy target samples is a random distribution relative to the latent, clean target sample. In practice, the input samples and the noisy target samples may be selected from one collection of noisy samples, such that a particular sample may be used as a noisy input sample for a first training pair and as a noisy target sample for a second training pair. The same sample cannot be used as both the noisy input sample and the noisy target sample for a particular training pair because the noise is correlated.

In one embodiment, the distribution of the noisy target samples relative to the latent, clean target sample is such that the latent, clean target sample is an average (i.e., mean) of the noisy target samples. For example, for a particular pixel of an image, an average of the color value of that pixel for all of the images in the noisy target samples is color value for the same pixel in the latent, clean target sample. In another embodiment, the data distribution of the noisy target samples relative to the latent, clean target sample is such that the latent, clean target sample is a most frequently occurring (i.e., median) of the noisy target samples. For example, for a particular pixel of an image, the most frequently occurring color value of that pixel for all of the images in the noisy target samples is color value for the same pixel in the latent, clean target sample.

At step 140, parameter values of the neural network model are adjusted to reduce differences between the output of the neural network and the noisy target sample. In one embodiment, a least squares (i.e., L2) loss function is applied to the differences to adjust the parameter values. In another embodiment, a least absolute deviations (i.e., L1) loss function is applied to the differences to adjust the parameter values.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
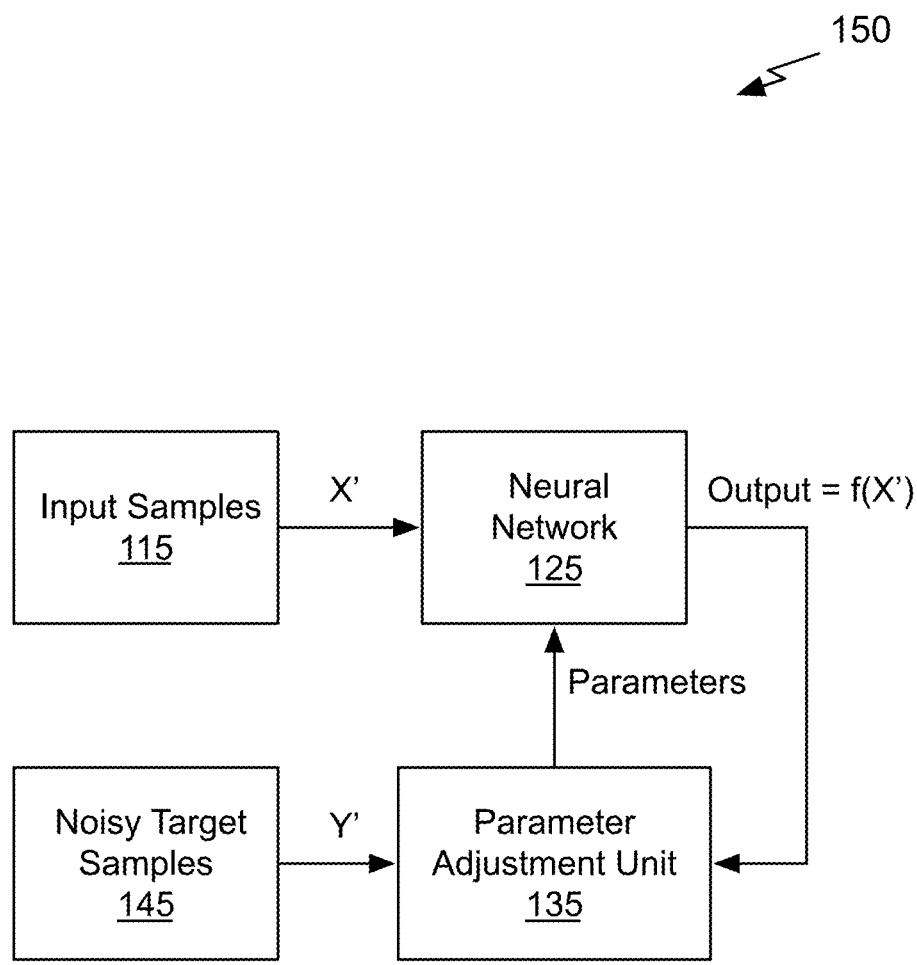
FIG. 1B illustrates a block diagram of a system for training a neural network, in accordance with one embodiment.

FIG. 1B illustrates a block diagram of a system 150 for training a neural network 125, in accordance with one embodiment. The system 150 includes a training dataset including input samples 115 and noisy target samples 145, Y'. In one embodiment, the input samples are noisy input samples X', as shown in FIG. 1B. In another embodiment, the input samples 115 are clean input samples X. The training dataset may be stored in a memory. In one embodiment, when the input samples 115 are noisy input samples, the noise associated with the noisy input samples 115 is not correlated with the noise associated with the noisy target samples 145. In other words, the noisy input samples 115 and the noisy target samples 145 are exclusive. In one embodiment, the input samples 115 and the noisy target samples 145 may be selected from one collection of noisy samples, such that a first sample may be used as an input sample and a second sample, that is different than the first sample, may be used as a noisy target sample for a first training pair.

An input sample from the input samples 115 and parameter values (e.g., weights) are input to the neural network 125 to produce an output, f(X'). A parameter adjustment unit 135 receives the output and a noisy target sample, from the noisy target samples 145, that is paired with the input sample and adjusts the parameter values based on a comparison between the noisy target sample and the output. After the neural network 125 is trained, the neural network 125 may be deployed to apply the adjusted parameter values to noisy input data and generate clean output data.

In one embodiment, the parameter values are not adjusted for each output, but are instead adjusted for a batch of N outputs, where N is greater than 1. Gradients computed by the parameter adjustment unit 135 may be averaged for the N outputs before the parameter values are adjusted. The parameter adjustment unit 135 is configured to adjust the parameter values to reduce differences between the output and the noisy target samples.

In one embodiment, when the clean target sample substantially equals a mean of the data distribution of the noisy target samples 145, the parameter values are adjusted using a least squares regression based on differences between the noisy target samples 145 and the outputs. In one embodiment, the mean substantially equals the clean target sample Y when the mean is within 5% of the clean target sample. A loss function may be computed by the parameter adjustment unit 135 to measure distances (e.g., differences or gradients) between the noisy target samples 145 and the outputs. In one embodiment, the method disclosed in FIG. 1A may be used by the system 150 to train the neural network 125 by replacing the ground truth, clean target samples Y with the noisy target samples Y'=Y+N, where the mean of the distribution of Y' matches the clean target sample Y. For example, the input samples 115 X' might be noisy Monte Carlo renderings, and the corresponding distribution of noisy target samples 145 is Y'=Y+N different noisy instances of the same (unknown) ground truth sample Y, corrupted by statistically independent, additive zero-mean noise N. The zero-mean property of the noise guarantees E[Y']=Y. In another embodiment, the noisy targets may be corrupted by signal-dependent noise such as Poisson noise (also known as shot noise) or multiplicative noise Y'=Y*N, with the zero-mean properties of the noise such that E[Y']=Y.

In another embodiment, when the clean target sample equals a median of the data distribution of the noisy target samples, the parameter values are adjusted using a least absolute deviations loss function based on the differences between the noisy target samples 145 and the outputs. In one embodiment, the method 100 shown in FIG. 1A may be used by the system 150 to train the neural network 125 by replacing the ground truth, clean target samples Y with the noisy target samples Y', where the median of the distribution of Y' matches the clean target sample Y. In other words, when the clean target sample is an image, the most frequently occurring values for each pixel across the distribution of the noisy target samples 145 Y' matches the value for each respective pixel in the clean target sample Y. The noisy input samples and the noisy target samples may both be corrupted with non-noise data (e.g., text) when the median value of the distribution of the noisy target samples 145 Y' matches the clean target sample Y.

During conventional training, differences between the ground truth samples and outputs of the neural network 125 represent a first level of randomness. When the ground truth target samples are replaced with the noisy target samples 145, the noise in the noisy target samples 145 and the noisy input samples 115 is an additional level of randomness. However, the gradients that are computed by the parameter adjustment unit 135 and used to adjust the parameter values, on-average, converge towards the same adjusted parameter values when the noisy target samples 145 are used as when the ground truth target samples are used.

While the additional level of stochasticity resulting from the noise makes training the neural network 125 more difficult, requiring more time to converge, the accuracy of the neural network 125 is similar to that of a conventionally trained neural network once the training is completed. However, the speed at which the training dataset may be generated that includes the noisy target samples may offset the additional training time compared with generating a training dataset having the ground truth target samples. For example, the training dataset may be produced in real-time, enabling "live training" as part of a walk-through in an interactive system. For example, as a user navigates through a three-dimensional (3D) scene, a noisy training dataset may be rendered and the neural network 125 deployed in a viewing application may be trained to generate clean images of the 3D scene at interactive rates. In another example, images of an environment, such as the view in front of an autonomous vehicle may be captured at low resolution, and the neural network 125 within a display may be trained to generate clean images of the environment at interactive rates. In another example, images of an environment, such as the view in front of an autonomous vehicle may be captured at low lighting conditions, during night time, which introduces noise at short exposure times. The neural network 125 within a display may be trained to generate clean images of the environment at interactive rates. In yet another example, the view could be captured using a depth sensing device, such as a time-of-flight sensor or a LIDAR, leading to noisy estimates of the depth. The neural network 125 would learn to remove this noise. In a further example, Functional Magnetic Resonance (MRI) images captured using different, randomized slices or other subsets of the spectral representation of the volume undergoing scanning, may be fed in as a sequence to train a neural network to reconstruct high-quality volumetric images based only on the limited amount of information that corresponds to a short pulse sequences. Importantly, the technique of training the neural network 125 using noisy target samples using the method 100 is domain independent.

Figure 1C:
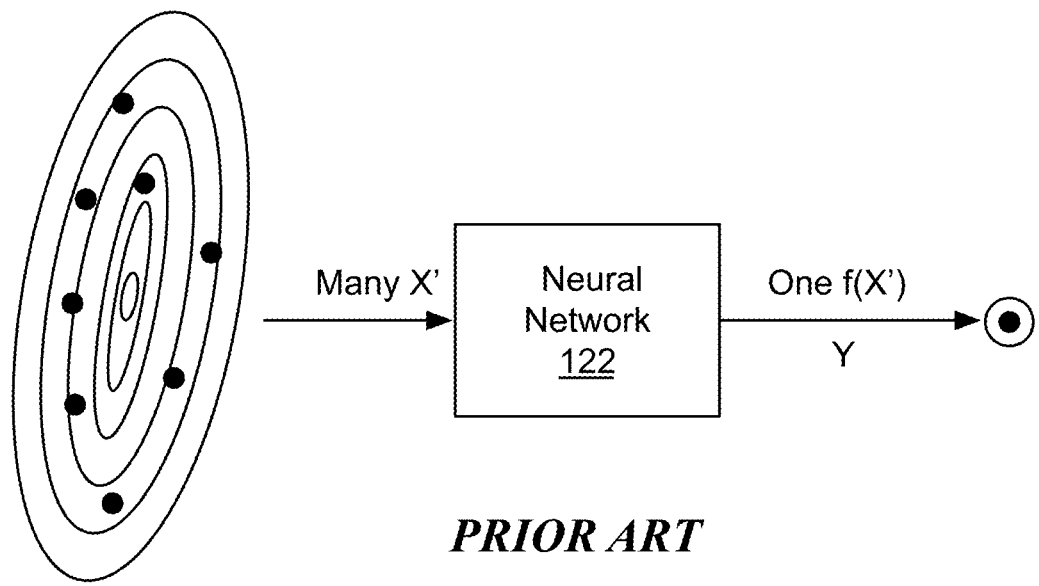
FIG. 1C illustrates a conceptual diagram of prior art neural network training using corrupted input data and one ground truth training target.

FIG. 1C illustrates a conceptual diagram of prior art neural network training using corrupted input data and one ground truth target. Given a conventional training dataset including noisy input sample and clean (i.e., ground truth) target sample pairs (X',Y), a neural network 122 is trained by providing a noisy sample X' to produce an output f(X'). The neural network parameters are adjusted to reduce a loss function that measures the distance between f(X') and Y. As shown in FIG. 1C, when conventional neural network training is used to train the neural network 122, many noisy input samples X' are provided to the neural network 122 and each noisy input sample X' is paired with the same clean target sample Y. In tasks such as denoising, typically many different corrupted/noisy inputs X' correspond to a single uncorrupted/clean target Y. For example, the same image may be corrupted by infinitely many different patterns of noise.

Figure 1D:
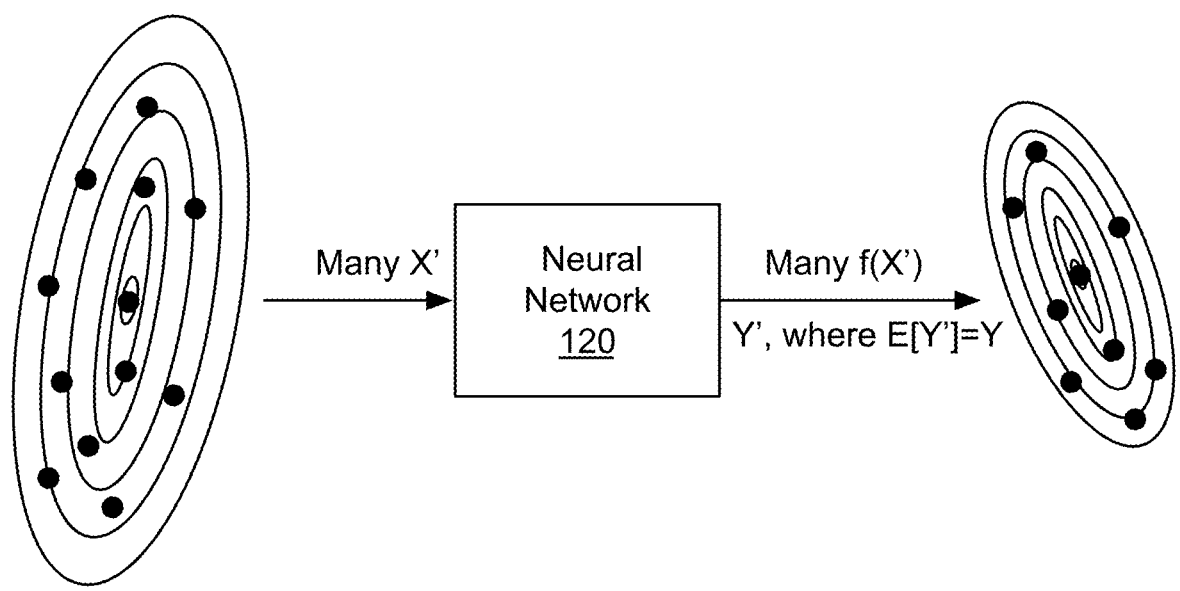
FIG. 1D illustrates a conceptual diagram of neural network training using corrupted input data and multiple noisy training targets, in accordance with one embodiment.

FIG. 1D illustrates a conceptual diagram of neural network training using noisy input samples and multiple noisy target samples, in accordance with one embodiment. In contrast with the conventional neural network training that uses a clean target sample Y, each of the many noisy input samples X' are paired with a different noisy target sample Y', where the mean of the different noisy target samples Y' substantially equals the clean target sample Y. During training, the neural network 125 learns to output the mean of the noisy target samples Y', where the mean equals the clean target sample Y (i.e., E[Y']=Y). Importantly, the clean target sample Y does not have to be explicitly known, as long as noisy target samples Y' can be drawn from a distribution whose mean equals Y. While the clean target sample Y is present within the noisy target samples Y', the clean target sample Y cannot be directly observed and is therefore "latent".

Figure 1E:
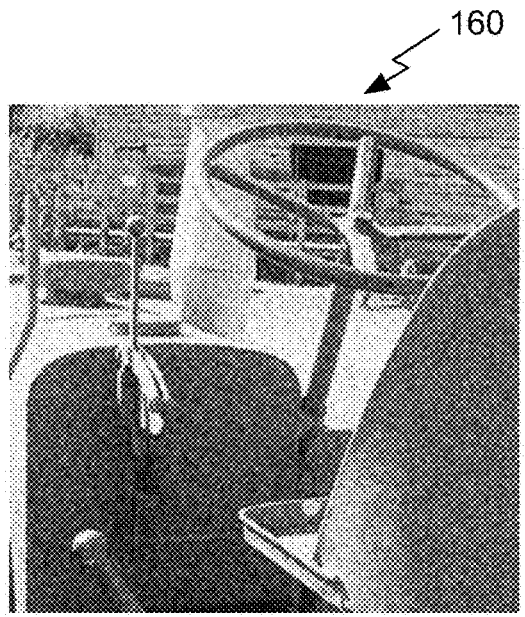
FIGS. 1E and 1F illustrate noisy training pairs for training the neural network, in accordance with one embodiment.
Figure 1E:
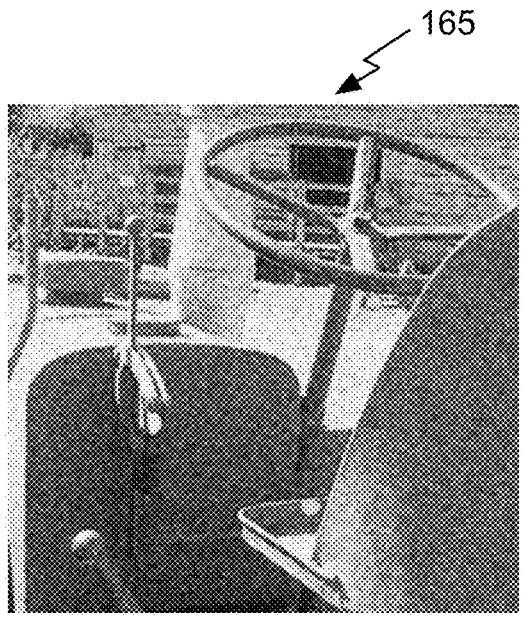
Figure 1E:
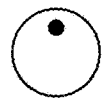
Figure 1E:
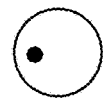

FIG. 1E illustrates a noisy training pair for training the neural network 125, in accordance with one embodiment. The noisy training pair includes a noisy input image 160 and a noisy target image 165. A circle under each image conceptually illustrates a sample position within a distribution of the noisy input images and the noisy target images included in the noisy training dataset. Importantly, the sample positions for the noisy input image 160 and the noisy target image 165 are different, so that the noise in the noisy input image 160 is not correlated with the noise in the noisy target image 165.

Figure 1F:
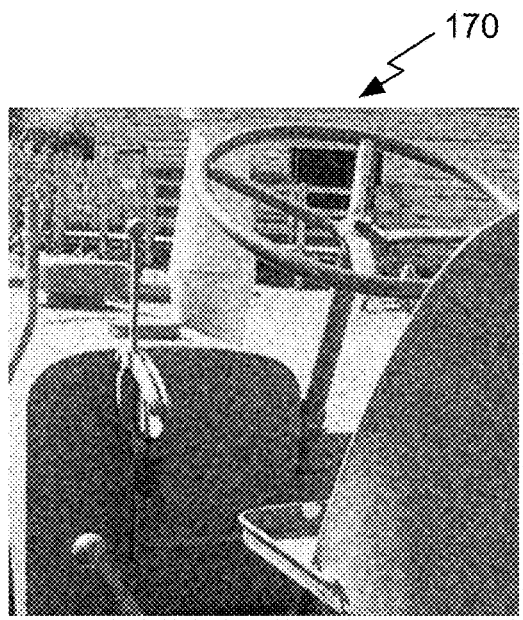
Figure 1F:
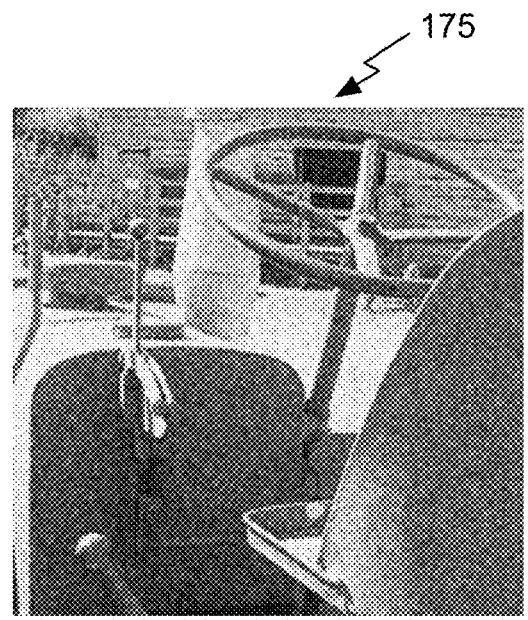
Figure 1F:
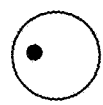
Figure 1F:
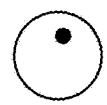

FIG. 1F illustrates another noisy training pair for training the neural network 125, in accordance with one embodiment. The second noisy training pair is included in the same training dataset as the noisy training pair shown in FIG. 1E and includes a noisy input image 170 and a noisy target image 175. The sample positions for the noisy input images 160 and 170 are different and the sample positions for the noisy target images 165 and 175 are different. Also, the noise in the noisy input image 170 is not correlated with the noise in the noisy target image 175. After training is completed using the noisy training dataset including the noisy image training pairs shown in FIGS. 1E and 1F, the neural network 125 will output a clean target image. In one embodiment, the mean of the distribution of the noisy target images in the noisy training dataset substantially equals the clean target image. The parameter adjustment unit 135 may be configured to perform an L2 (least squares) regression to tune the neural network 125 by adjusting the parameter values when the mean value of the distribution of the noisy target images in the noisy training dataset matches the clean target image.

Figure 1G:
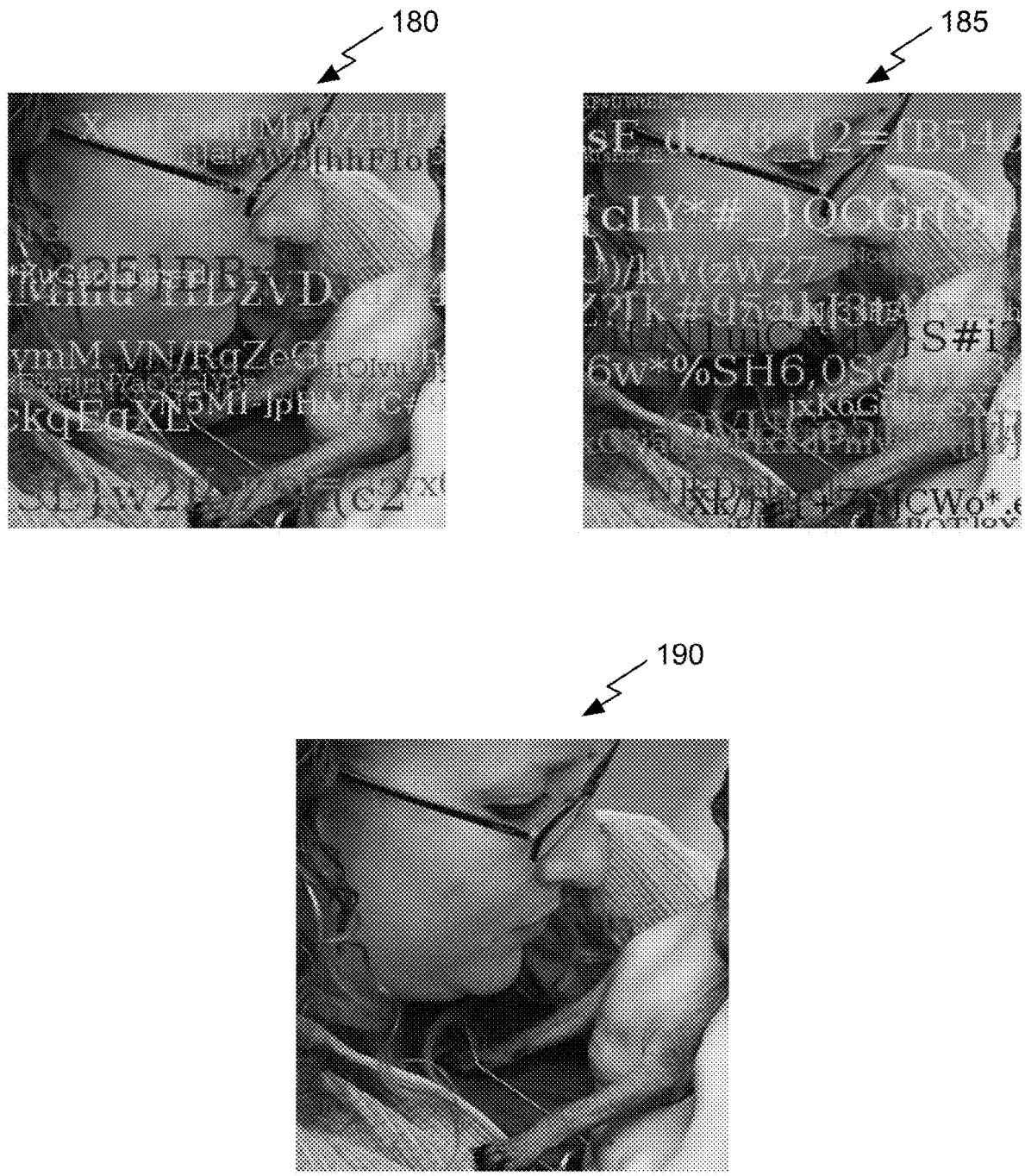
FIG. 1G illustrates a corrupted training pair for training the neural network and the recovered clean image, in accordance with one embodiment.

FIG. 1G illustrates a corrupted training pair for training the neural network 125 and the recovered clean image, in accordance with one embodiment. The corrupted training pair includes a corrupted input image 180 and a corrupted target image 185. Importantly, the corruption in the corrupted input image 180 is not correlated with the corrupted in the noisy target image 185. After training is completed using the corrupted training dataset including the corrupted input image 180 and a corrupted target image 185, the neural network 125 will output a clean image 190. The mean of the distribution of corrupted target images corrupted with colored text in the corrupted training dataset is an image with text that converges to a gray color during training rather than the de-noised, clean image 190. The mean of a color for a pixel includes the clean color and one or more colors from the corrupting text. As the corrupting text colors are averaged together with the clean color for a pixel, the color of the pixel fades to gray.

However, while the mean does not produce the correct result, the median of the distribution of the noisy target images corrupted with text in the noisy training dataset does substantially equal the de-noised, clean image 190. The parameter adjustment unit 135 may be configured to perform an L1 (least absolute deviations) regression to tune the neural network 125 by adjusting the parameter values when the median value of the distribution of the noisy target images in the noisy training dataset matches the clean target image.

Importantly, the de-noised, clean image 190 does not have to be explicitly known, as long as the corrupted input image 180 and the corrupted target image 185 are be drawn from a corrupted training dataset having a distribution of corrupted images whose median is the uncorrupted, clean image 190. While the uncorrupted, clean image 190 is present within the corrupted training dataset, the uncorrupted, clean image 190 cannot be directly observed and is therefore "latent".

Figure 2A:
FIG. 2A illustrates a noisy image for training the neural network and adjusting parameter values, in accordance with one embodiment.

FIG. 2A illustrates a noisy image for training the neural network 125 and adjusting parameter values, in accordance with one embodiment. The image in FIG. 2A is an astrophotography image called an H-alpha, OIII, SII emission spectrum (photo by Samuli Vuorinen). Astrophotography is inherently very low light, and the exposure times are very long. The exposure times are so long, that the images within a noisy training dataset are not perfectly aligned due to the rotation of Earth. Furthermore, bursts of images (e.g. 100 images) are captured with an exposure time of T instead of a single image with an exposure time 100T, to enable the removal of artifacts, such as satellite streaks. An example noisy training dataset for astrophotography may include 10 noisy images for each of 100 individual observations, where an observation corresponds to a substantially static area of the sky.

When the noisy target image is a photograph, such as the astrophotography shown in FIG. 2A, an uncertainty of the unknown, latent, noise-free pixel values is proportional to the measured pixel values of the noisy target image. The observed pixel values in the brightest areas of the noisy target image (e.g. stars in astrophotography) are thus also the least certain values. It is beneficial to scale down the values of pixels having greater uncertainty during evaluation of the loss function by dividing the corresponding pixel values in the loss function by the expected uncertainty. Importance values may be computed and used to scale loss function values that are used to compute the parameter values of the neural network model, where a lower importance value corresponds to greater uncertainty. Scaling down the pixel values in the brightest areas of the noisy target image increases robustness and focuses on the darker areas of the image. In one embodiment, the parameter adjustment unit 135 may be configured to scale entries of the loss function that are computed as differences between the output of the neural network 125, f(X'), and the noisy target samples, Y'. In the absence of the unknown, latent image, another, independent noisy image, referred to as Y"=Y+N3 may be used as an unbiased estimate of the uncertainty and used to compute importance values.

Figure 2B:
FIG. 2B illustrates a de-noised image, in accordance with one embodiment.

FIG. 2B illustrates a de-noised image, in accordance with one embodiment. The de-noised image shown in FIG. 2B is generated by the trained neural network 125 when the parameter adjustment unit 135 computes a loss function using computed importance values. The neural network is trained using noisy input images and noisy target images, such as the image shown in FIG. 2A.

Figure 2C:
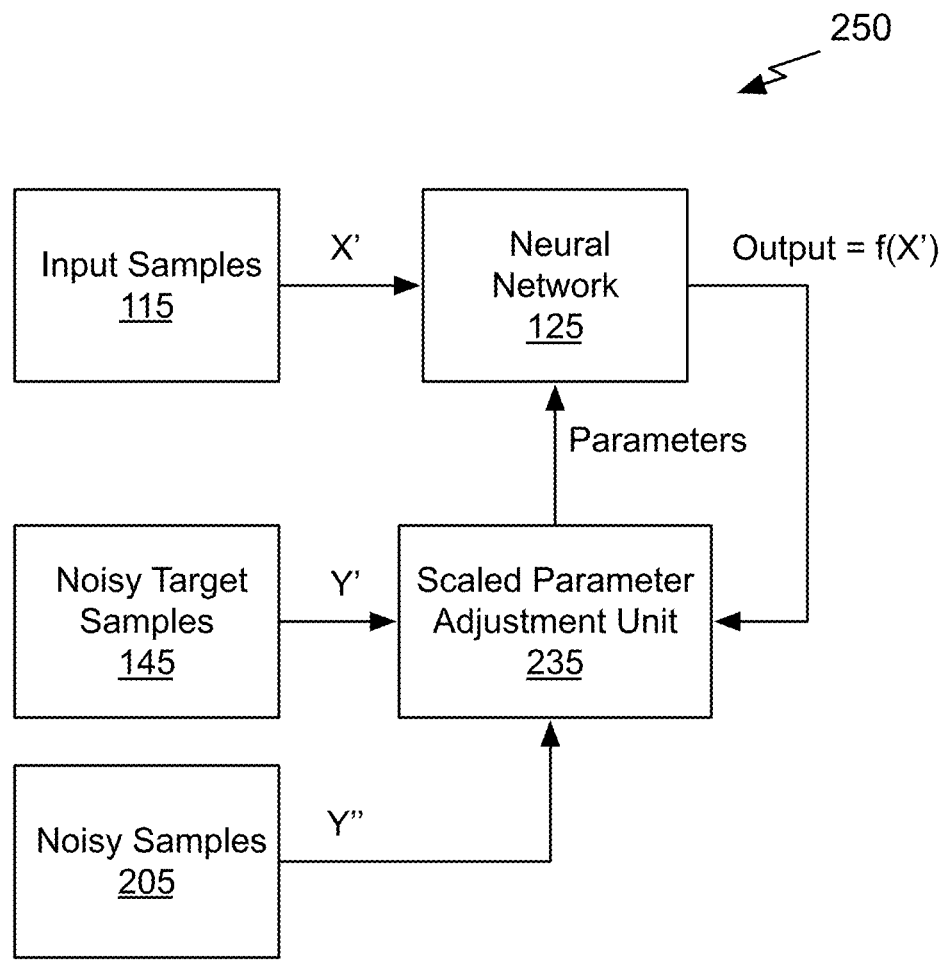
FIG. 2C illustrates another block diagram of a system for training a neural network, in accordance with one embodiment.

FIG. 2C illustrates another block diagram of a system 250 for training the neural network 125, in accordance with one embodiment. The system 250 includes a training dataset including input samples 115, noisy target samples 145, Y', and noisy samples 205, Y". In one embodiment, when the input samples 115 are noisy input samples, the noise associated with the noisy input samples 115 is not correlated with either the noise associated with the noisy target samples 145 or the noise associated with the noisy samples 205. In one embodiment, the input samples 115, the noisy target samples 145, and the noisy samples 205 may be selected from one collection of noisy samples, such that a first sample may be used as an input sample and a second sample, that is different than the first sample, may be used as a noisy target sample for a first training pair. A third sample, Y", that is different than either the first sample or the second sample, may be used as a noisy sample for computing importance values that are used to scale the loss function values.

An input sample from the input samples 115 and parameter values (e.g., weights) are input to the neural network 125 to produce an output, f(X'). A parameter adjustment unit 235 receives the output and a noisy target sample that is paired with the input sample from the noisy target samples 145. The parameter adjustment unit 235 also receives an additional noisy sample from the noisy samples 205 and adjusts the parameter values based the additional noisy sample and on a comparison between the noisy target sample and the output. In one embodiment, the noisy samples 205 are independent noisy samples, Y"=Y+N3 that may be used as an unbiased estimate of uncertainty. After the neural network 125 is trained, the neural network 125 may be deployed to apply the adjusted parameter values to noisy input data and generate clean output data, such as the de-noised image shown in FIG. 2B. In one embodiment, the parameter adjustment unit 235 is configured to compute importance values based on the output of the neural network 125, f(X'), the noisy target samples, Y', and the additional noisy sample Y". As part of adjusting the parameters, the parameter adjustment unit 235 scales the loss function values by the importance values.

In one embodiment, the parameter values are not adjusted for each output, but are instead adjusted for a batch of N outputs, where N is greater than 1. Gradients computed by the parameter adjustment unit 235 may be averaged for the N outputs before the parameter values are adjusted. The parameter adjustment unit 235 is configured to adjust the parameter values to reduce differences between the output and the noisy target samples.

In one embodiment, when the clean target sample substantially equals a mean of the data distribution of the noisy target samples 145, the parameter values are adjusted using a least squares regression based on differences between the noisy target samples 145 and the outputs. In another embodiment, when the clean target sample equals a median of the data distribution of the noisy target samples, the parameter values are adjusted using a least absolute deviations regression based on the differences between the noisy target samples 145 and the outputs.

Figure 2D:
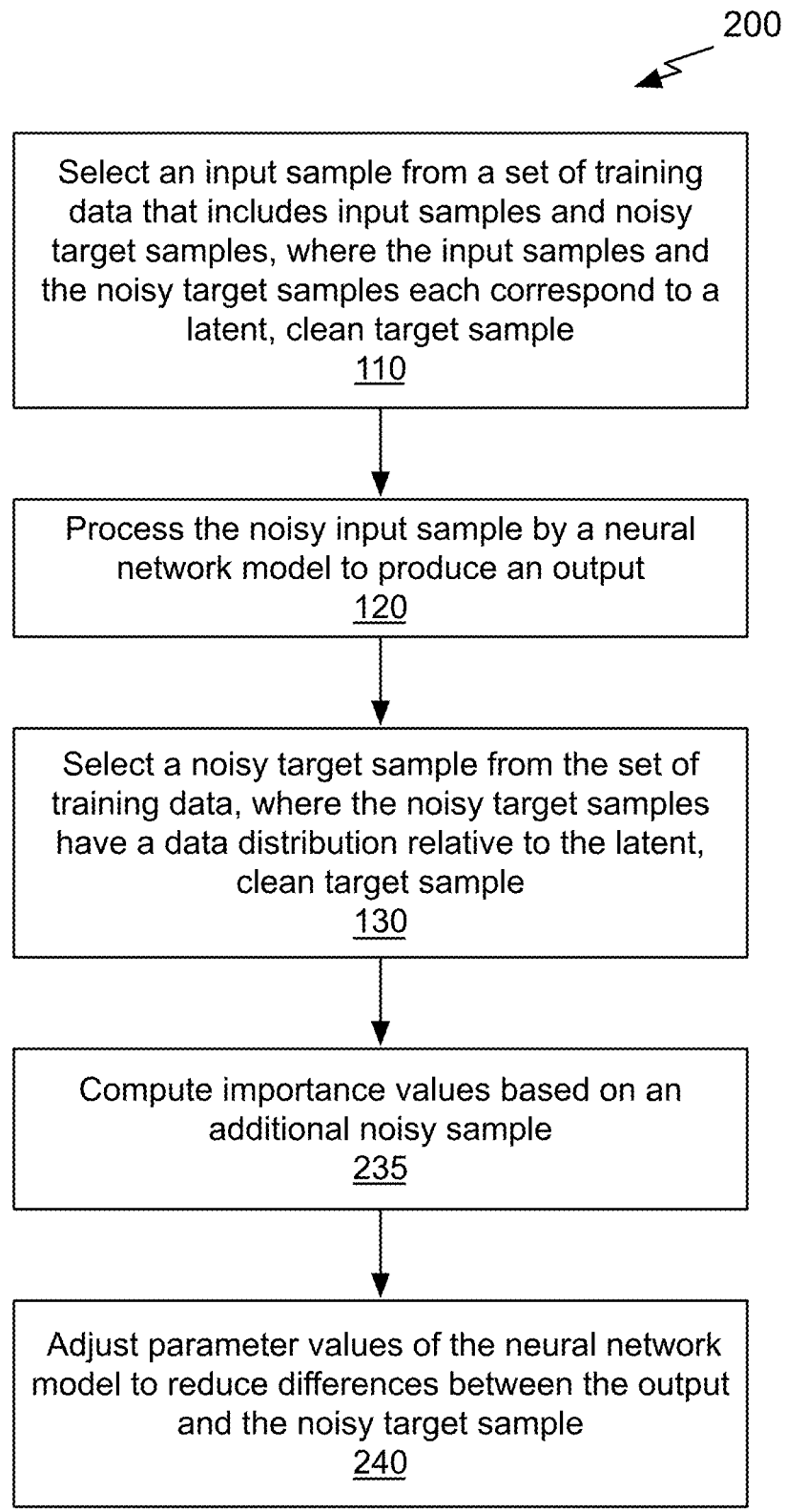
FIG. 2D illustrates a flowchart of another method for training a neural network, in accordance with one embodiment.

FIG. 2D illustrates a flowchart of another method 200 for training the neural network 125, in accordance with one embodiment. The method 200 is described in the context of a neural network, and the method 200 may also be performed by a program, custom circuitry, or by a combination of custom circuitry and a program. For example, the method 200 may be executed by a graphics processing unit (GPU), central processing unit (CPU), or any processor capable of performing the necessary processing operations. Furthermore, persons of ordinary skill in the art will understand that any system that performs method 200 is within the scope and spirit of embodiments of the present invention.

Steps 110, 120, and 130 are completed as previously described in conjunction with FIG. 1A. At step 235, the scaled parameter adjustment unit 235 computes importance values based on an additional noisy input sample. The importance values may reduce the importance of output data and/or noisy target samples having greater uncertainty before evaluation of the loss function by dividing the corresponding parameters by the expected uncertainty. For example, when a least squares loss function is used, the importance value may be computed as $(Y''^2+\varepsilon)$, where c is a small number that prevents a subsequent division by zero. The square of the difference between f(X') and Y' is then scaled by the importance value: $(f(X')-Y')^2/(Y''^2+\varepsilon)$. As another example, when a least absolute deviation loss function is used, the difference between f(X') and Y' is scaled by the importance value: $|f(X')-Y'|/(Y''+\varepsilon)$, where $(Y''+\varepsilon)$ is the importance.

At step 240, parameter values of the neural network model are adjusted by the scaled parameter adjustment unit 235 to reduce differences between the output and the noisy target sample. As part of the adjusting, the scaled parameter adjustment unit 235 is also configured to scale the loss function values based on an additional noisy sample provided by the noisy samples 205. In one embodiment, a least squares (i.e., L2) loss function is applied to the differences, by the scaled parameter adjustment unit 235, to adjust the parameter values. In another embodiment, a least absolute deviations (i.e., L1) loss function is applied to the differences, by the scaled parameter adjustment unit 235, to adjust the parameter values.

Importantly, no ground truth (clean) target samples are needed to train the neural network 125. Instead noisy target samples and noisy input samples may be used to train the neural network 125 to de-noise input data. In one embodiment, the data distribution of the noisy target samples 145 relative to the latent, clean target sample is such that the latent, clean target sample is an average (i.e., mean) of the noisy target samples 145. In another embodiment, the data distribution of the noisy target samples 145 relative to the latent, clean target sample is such that the latent, clean target sample is a most frequently occurring (i.e., median) of the noisy target samples 145. The noisy training dataset may be generated quickly, much faster and with fewer computations than the clean target samples. Therefore, even though the training time is increased, the duration of the training dataset generation and training time is significantly decreased compared with conventional training that requires the clean target samples.

Parallel Processing Architecture

Figure 3:
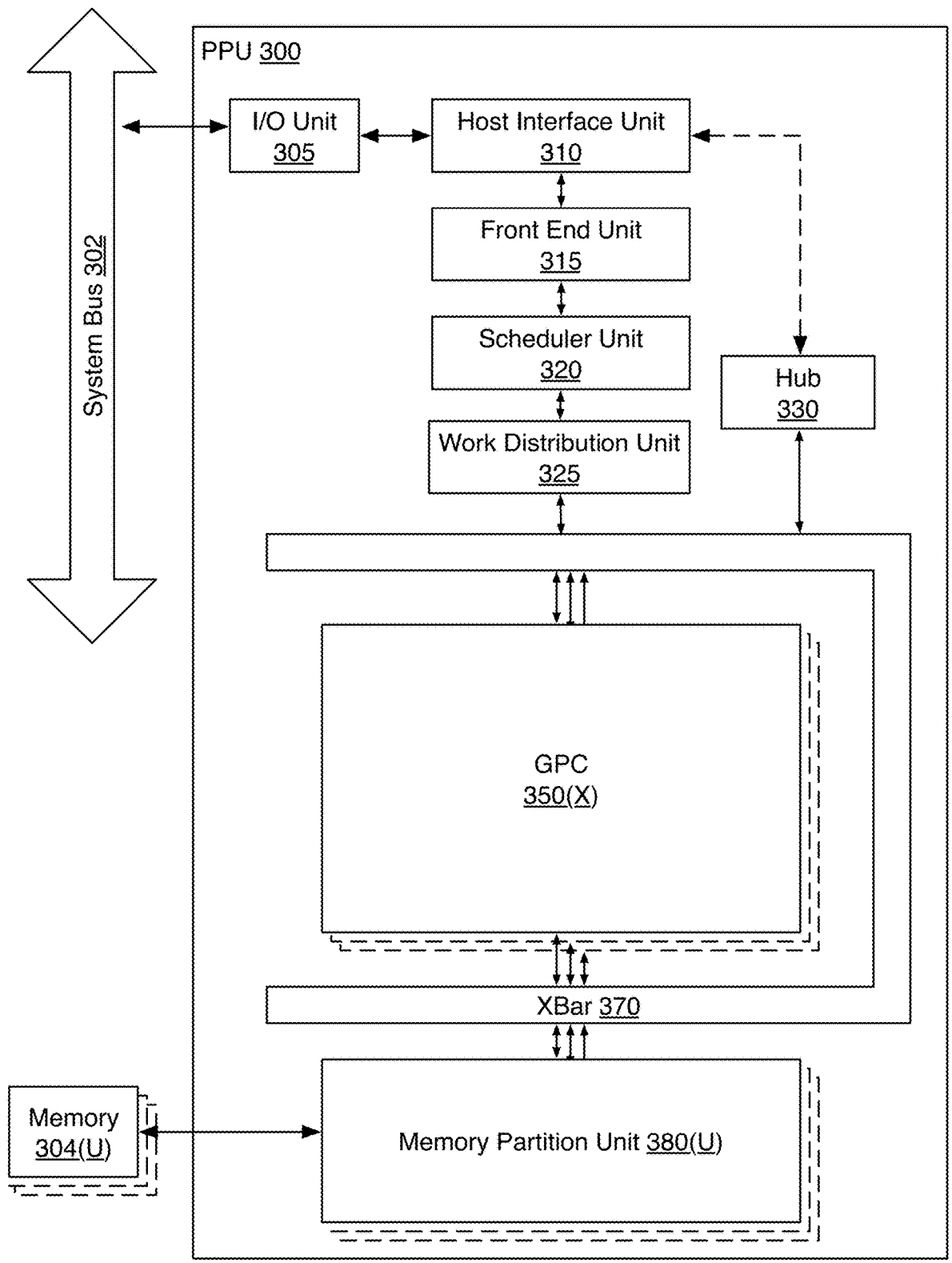
FIG. 3 illustrates a parallel processing unit, in accordance with one embodiment.

FIG. 3 illustrates a parallel processing unit (PPU) 300, in accordance with one embodiment. The PPU 300 may be configured to implement the neural network training system 150 or 250.

In one embodiment, the PPU 300 is a multi-threaded processor that is implemented on one or more integrated circuit devices. The PPU 300 is a latency hiding architecture designed to process a large number of threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise a number of instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
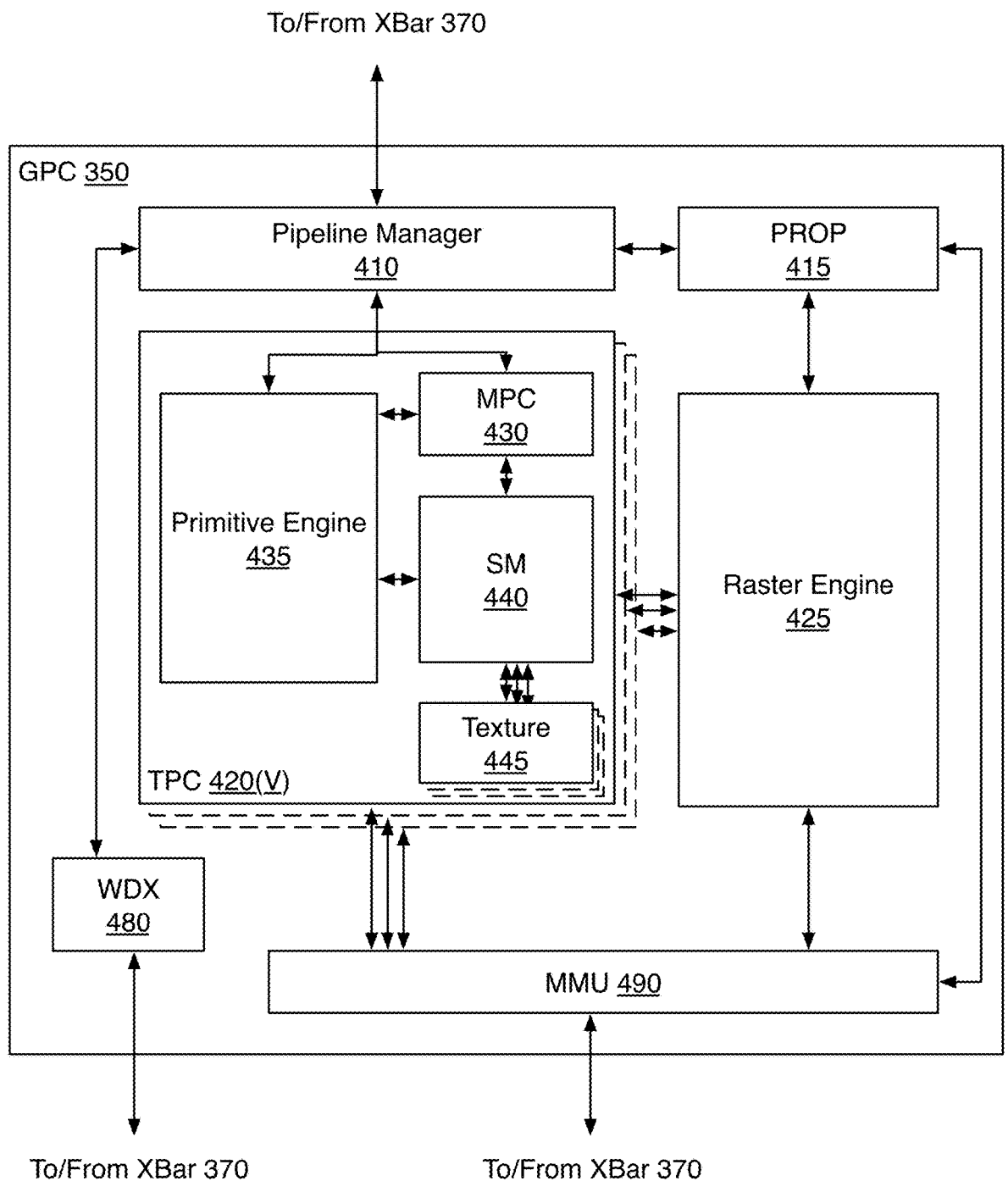
FIG. 4A illustrates a general processing cluster of the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 may be described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for improving translation of virtual addresses into physical addresses in the memory 304.

Figure 4B:
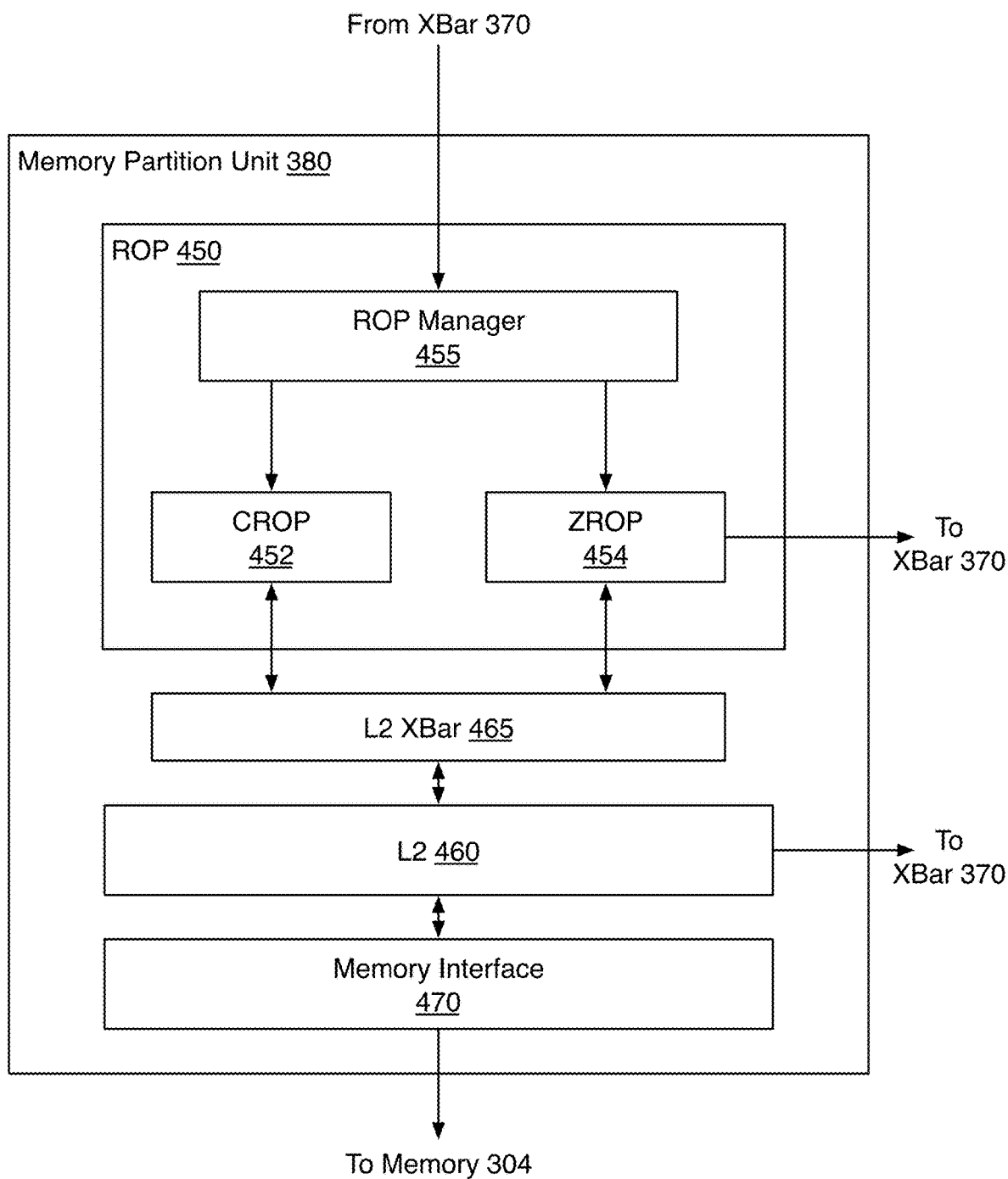
FIG. 4B illustrates a partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 comprises U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
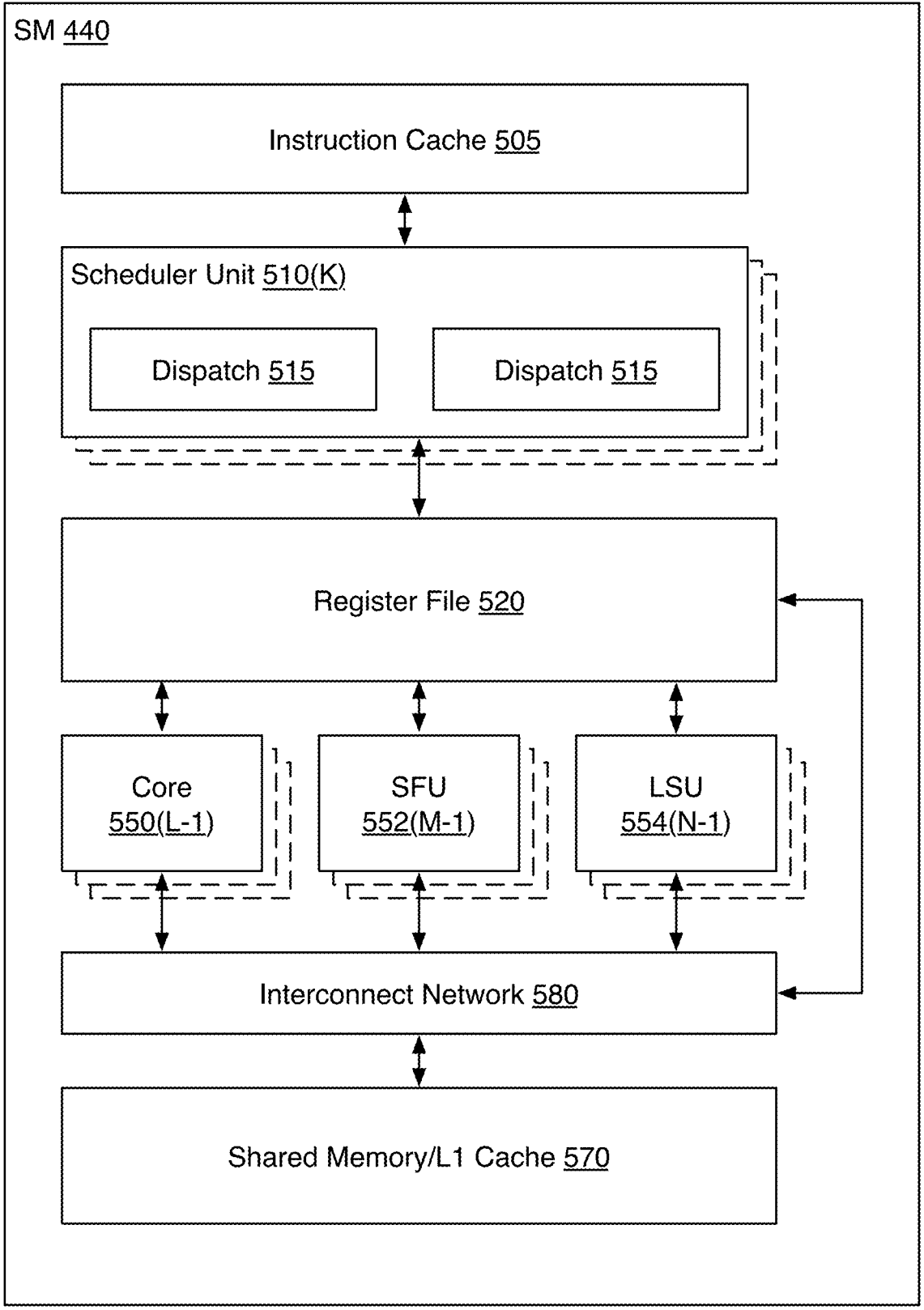
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes.

The PPU 300 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 communicate between threads, and the LSU 554 to read and write Global memory through partition shared memory/L1 cache 570 and partition unit 380.

When configured for general purpose parallel computation, the SM 440 can also write commands that scheduler unit 320 can use to launch new work on the TPCs 420. In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various CNN, FC 135, and RNN 235 layers of the video classification systems 115, 145, 200, 215, and 245. For example, the device driver may launch a kernel on the PPU 300 to implement at least one 2D or 3D CNN layer on one SM 440 (or multiple SMs 440). The device driver (or the initial kernel executed by the PPU 300) may also launch other kernels on the PPU 300 to perform other CNN layers, such as the FC 135, RNN 235 and the classifier 105, 106, or 206. In addition, some of the CNN layers may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
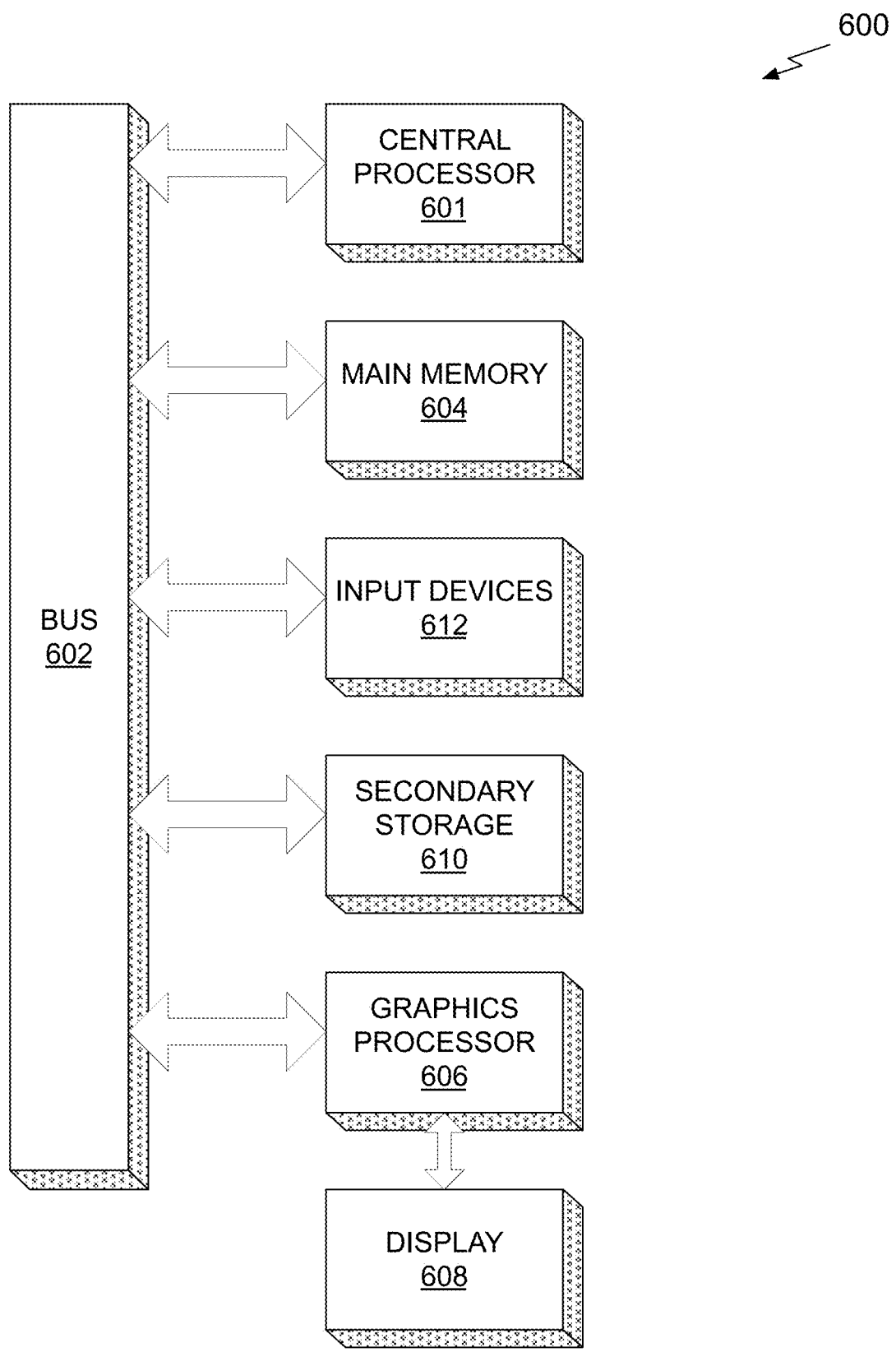
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be used to implement the neural network training systems 150 and/or 250.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. Data streams associated with gestures may be stored in the main memory 604 and/or the secondary storage 610.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for training a neural network, comprising:
    selecting an input sample from a set of training data that includes input samples and noisy target samples, wherein the input samples and the noisy target samples each correspond to a latent, clean target sample;
    processing the input sample by a neural network model to produce an output;
    selecting a noisy target sample from the set of training data, wherein the noisy target samples have a distribution relative to the latent, clean target sample; and
    adjusting parameter values of the neural network model to reduce differences between the output and the noisy target sample.

2. The computer-implemented method of claim 1, wherein the clean target sample equals a mean of the distribution of the noisy target samples.

3. The computer-implemented method of claim 2, wherein the parameter values are adjusted using a least squares loss function based on the differences.

4. The computer-implemented method of claim 1, wherein the clean target sample equals a median of the distribution of the noisy target samples.

5. The computer-implemented method of claim 4, wherein the parameter values are adjusted using a least absolute deviations loss function based on the differences.

6. The computer-implemented method of claim 4, wherein the input sample is corrupted with noise that is not correlated with either the input sample or the noisy target sample.

7. The computer-implemented method of claim 1, further comprising:
repeating, for at least one additional output, selecting the input sample, processing the input sample, and selecting the noisy target sample; and
before adjusting the parameter values, combining the differences for the output and additional differences for the at least one additional output and then adjusting the parameter values of the neural network model to reduce the combined differences.

8. The computer-implemented method of claim 7, wherein the combining averages the differences for the at least two outputs.

9. The computer-implemented method of claim 1, wherein noise in the noisy target samples is statistically independent, zero-mean noise.

10. The computer-implemented method of claim 1, wherein the input samples are clean input samples.

11. The computer-implemented method of claim 1, wherein the input samples are noisy input samples and the noise associated with the noisy input samples is not correlated with the noise associated with the noisy target samples.

12. The computer-implemented method of claim 1, further comprising:
processing the input sample to generate additional outputs;
selecting additional noisy target samples from the set of training data; and
adjusting the parameter values of the neural network model to reduce additional differences between the additional outputs and the additional noisy target samples.

13. The computer-implemented method of claim 1, further comprising:
selecting additional input samples from the set of training data;
processing the additional input samples to generate additional outputs;
selecting additional noisy target samples from the set of training data; and
adjusting the parameter values of the neural network model to reduce additional differences between the additional outputs and the additional noisy target samples.

14. The computer-implemented method of claim 1, further comprising:
selecting an additional noisy target sample from the set of training data;
computing importance values based on the output, the noisy target sample, and the additional noisy target sample; and
scaling loss function values of the neural network model by the importance values.

15. The computer-implemented method of claim 1, wherein the clean target sample is not used to compute the differences.

16. The computer-implemented method of claim 1, wherein each noisy target sample is different than the other noisy target samples in the set of training data.

17. The computer-implemented method of claim 1, wherein the input samples have a second distribution relative to the latent, clean target sample that is different compared with the distribution.

18. The computer-implemented method of claim 1, wherein the input samples also have the distribution relative to the latent, clean target sample.

19. A system, comprising:
a memory storing a set of training data that includes input samples and noisy target samples, wherein the input samples and the noisy target samples each correspond to a latent, clean target sample;
a parallel processing unit that is coupled to the memory and configured to:
select an input sample from the set of training data;
process the input sample by a neural network model to produce an output;
select a noisy target sample from the set of training data, wherein the noisy target samples have a distribution relative to the latent, clean target sample; and
adjust parameter values of the neural network model to reduce differences between the output and the noisy target sample.

20. A non-transitory computer-readable media storing computer instructions for training a neural network that, when executed by a processor, cause the processor to perform the steps of:
selecting an input sample from a set of training data that includes input samples and noisy target samples, wherein the input samples and the noisy target samples each correspond to a latent, clean target sample;
processing the input sample by a neural network model to produce an output;
selecting a noisy target sample from the set of training data, wherein the noisy target samples have a distribution relative to the latent, clean target sample; and
adjusting parameter values of the neural network model to reduce differences between the output and the noisy target sample.

* * * * *